Dec. 29, 1959  L. E. VAALER  2,919,115
IMPREGNATED POROUS CONDENSER SURFACES
Filed May 15, 1956
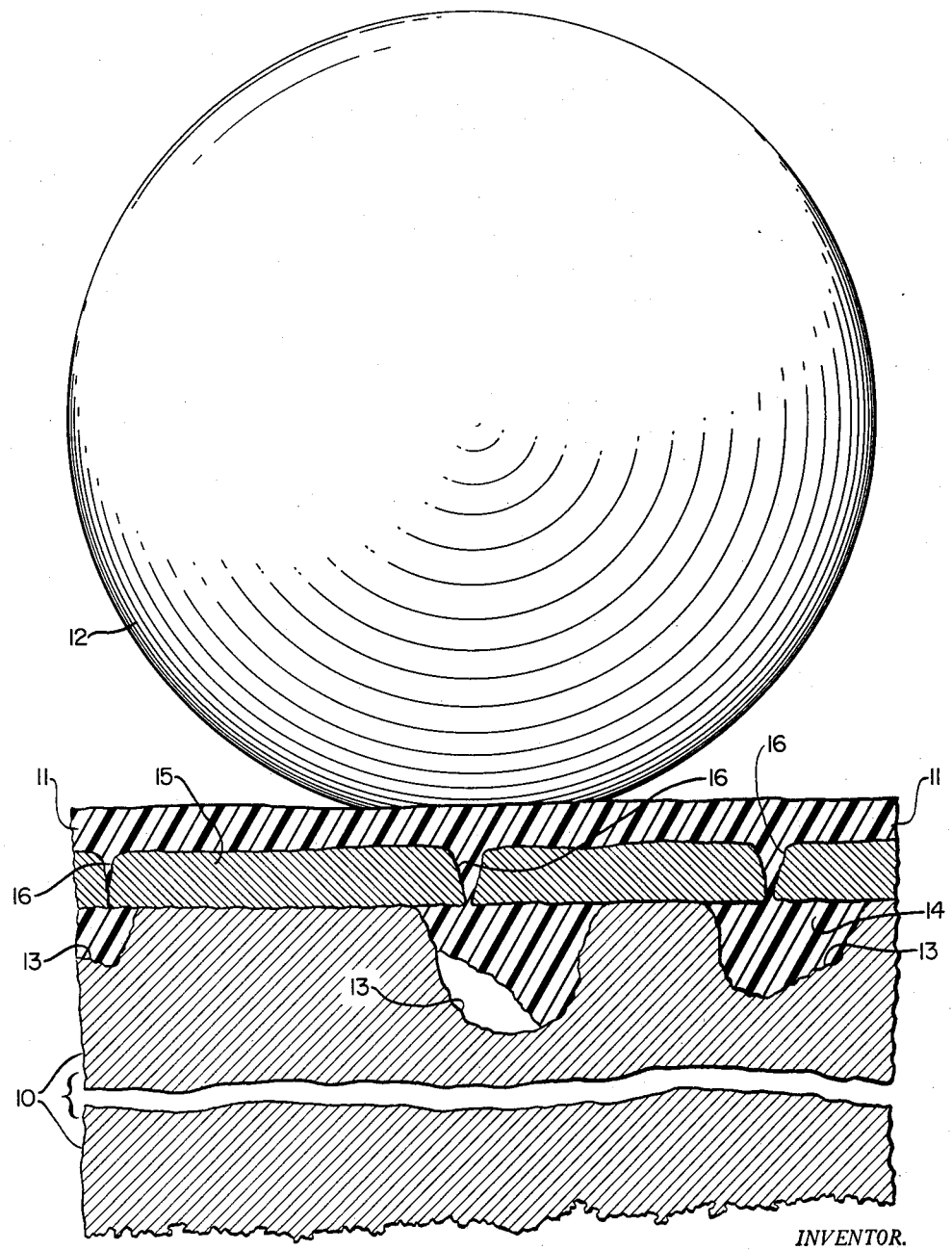
INVENTOR.
Luther E. Vaaler
BY Gray, Mase & Dunson
ATTORNEYS

United States Patent Office 2,919,115
Patented Dec. 29, 1959

2,919,115

IMPREGNATED POROUS CONDENSER SURFACES

Luther E. Vaaler, Columbus, Ohio, assignor, by mesne assignments, to The Griscom-Russell Company, Massillon, Ohio, a corporation of Delaware Application May 15, 1956, Serial No. 585,088

5 Claims. (Cl. 257—28)

This invention relates to heat-transfer devices and to members therein that provide high over-all coefficients of heat transfer for long periods of times. In a common form of heat exchanger, vapor is condensed on one surface of a separating wall and heat is conducted on this surface through the wall to the opposite surface that is cooled, whereby heat is lost on the vapor side of the wall and is gained on the other side. It is well known that when vapor condenses in drops on the surface, the rate of heat transfer is greater than when the condensing vapor forms a film on the surface. This invention has to do particularly with means for maintaining dropwise condensation indefinitely on a metallic surface that would otherwise provide filmwise condensation, or at best would maintain a dropwise condensation for only a limited time.

It is well known that filmwise condensation takes place on a truly clean metal surface, and that dropwise condensation takes place if the surface of the metal is even slightly contaminated by a material that is not wet by the condensed vapor. Such materials are called promoters.

The most useful known promoters are compounds containing polar groups to increase the adherence of the promoter to the metal surface. An adherent monomolecular layer is formed that is not wetted by the condensate. The extreme thinness of the monomolecular layer is an advantage, since it minimizes the resistance of the promoter film to the transfer of heat. Most promoters are poor conductors of heat and it is desirable that the promoter film be as thin as possible.

The presence of a polar group in a promoter renders it at least slightly soluble in water and in other polar liquids. A monomolecular layer of such a promoter does not last indefinitely in the presence of steam or vapors of other polar compounds. In a closed system, it is customary to maintain a monomolecular layer of polar promoter materials by continuously or periodically injecting an excess of the promoter material into the vapor, or by adding the promoter to the liquid before it is evaporated. Common nonpolar compounds, such as paraffin hydrocarbon, do not cling tenaciously to the surface of the metal, and have been considered to be unsuitable for promoting dropwise condensation for any substantial length of time. In addition, the common nonpolar compounds are dissolved by many nonpolar liquids and thus are not suitable for promoting dropwise condensation of these liquids.

In general, the present invention relates to a heat-transfer device wherein a vapor is condensed on a cooled metal surface. The condensing surface is supplied with a film of a material that will promote dropwise condensation. The present invention provides a system of promoter-filled reservoirs in the heat-transfer wall with capillary openings to the surface. Promoter material in the reservoirs is able to migrate to the surface by capillary action and replenish the promoting film. This makes it possible to maintain dropwise condensation without continually or frequently adding promoter material to the system from an external source. Also, such a coating retards or prohibits the formation of rust or scale on the condenser surface.

The primary object of the present invention is to increase the period during which dropwise condensation and improved heat transfer may be maintained without continuous or frequent additions of a promoter material to the system from an external source.

It is also an object of the invention to provide a means of increasing the duration of dropwise condensation and increase heat transfer by the use of a heat-exchanger wall containing reservoirs with openings to the condenser surface.

It is a further object of this invention to provide a surface that resists corrosion over an increased period of time.

It is also an object of this invention to provide a means of increasing the duration of a surface to which scale adheres poorly and thus prevent scale formation.

Other objects and advantageous features of the invention will be apparent from the disclosure and example.

The present invention contemplates heat-exchanger walls containing reservoirs of such size and distribution and in such numbers that the heat conductance is not appreciably lowered as compared to a solid wall but that a large increase in the vapor side coefficient of heat transfer is obtained over a long period of time due to the promotion of dropwise condensation. Therefore, the over-all heat-transfer coefficient is significantly increased over a long period of time.

In the drawing, the figure is a fragmentary sectional view, highly magnified, of a wall for separating the cooling fluid from the condensable vapor in a heat-transfer device.

Referring to the drawing, a wall 10 separates the cooling fluid below from the condensable vapor above in a heat-transfer device. The upper surface of the wall 10, to which the condensable vapor is applied, has a thin film 11 thereon comprising a dropwise promoter. Condensation on the film 11 forms in drops as is indicated at 12. The dropwise promoting material of film 11 extends into and is continuous with dropwise promoting material impregnated in pores 13, as at 14. The dropwise promoting material itself is preferably a liquid-repellent material capable of capillary migration from the pores 13 to the film 11 as film 11 is washed or erodes away. Plate 15 is an electrodeposited metallic plate which was plated in such a manner as to leave cracks which are now pore openings or capillary passageways 16. Pores or reservoirs 13 were etched out in acid solution.

It is necessary that sufficient interconnecting metal to transfer the heat be present between the pores. The amount present can be established by metallographic examination. The heat-transfer coefficient of a wall, as compared to the heat-transfer coefficient of a film at the hot and cold surfaces of the wall, has an important bearing on the amount of interconnecting material required. An over-all heat-transfer coefficient of 1000 B.t.u./ft.$^2$/ ° F./hr. in a condenser with $\frac{1}{16}$-inch-thick copper walls would be reduced about 2.4 percent if the conductivity of the copper were halved. The reason the reduction in the over-all coefficient is small is that the heat-transfer coefficient of the copper wall is much higher than the film coefficients. Therefore, the coefficient for the wall is not as important a factor as the film coefficient in fixing the over-all coefficient. The over-all heat-transfer coefficient in a condenser with an identical wall thickness but with a much less efficient heat-conducting material, such as 70 copper-30 nickel is more adversely affected by a decrease in conductivity of the wall. In such a case, a large cross section of the interconnecting metal around the pores is more important.

It is known that a film of oleic acid one molecule thick, on a chromium surface, will promote the dropwise condensation of steam for about 50 hours at the condensation rate commonly used in practical application. The surface area occupied by a single oleic acid molecule oriented with its polar carboxyl group toward the surface is about $1.6 \times 10^{-15}$ sq. cm. Using these values, it may be calculated that $4.52 \times 10^{-4}$ cu. in. of oleic acid is sufficient to replenish a monomolecular layer of oleic acid on a square inch of condensing surface for a period of 20 years.

In a 1/16-inch-thick heat-transfer wall, a porosity of $4.52 \times 10^{-4}$ cu. in./sq. in. represents only about 0.72 percent of the total volume of the wall. However, as pointed out above, the pores should not be concentrated in a layer near the surface in such a manner that the amount of metal in the layer is inadequate to conduct the heat.

The materials that may be impregnated into the porous condenser walls of the present invention may be any substance that is substantially insoluble in the condensing liquid, that will form a film over the condenser wall, and that possesses sufficient viscosity and adherence properties to permit capillary attraction or migration to the surface of the condensing wall. A conventional dropwise promoter, such as one that possesses molecular polar groups which adhere to a metal surface and form a substantially insoluble monomolecular layer or film on a condensing surface, is naturally subject to capillary attraction when impregnated into the condensing walls. For practical purposes, of course, these materials must possess sufficient viscous flow to permit a capillary migration of sufficient magnitude to replenish the gradually disappearing dropwise promoting film.

The nonwettable surface of the promoter increases not only the heat-transfer rate but also resistance to corrosion, since corrosive fluid is not able to wet and penetrate the promoter film. Solids also adhere poorly to most promoter surfaces. Thus, scale formed on a nonwettable surface either falls off or is easily removed.

The period of time that dropwise condensation is produced on a condenser surface may be greatly increased with the following types of subsurface reservoir systems:

Chromium is electrodeposited on the heat-exchanger wall, under carefully controlled conditions, in such a way that the deposit contains a series of interconnecting hairline cracks. The cracks are opened up by electrolytic etching. A small amount of reservoir capacity is obtained in this way, depending on the thickness of chromium plate. However, further reservoir capacity is desirable for maintaining dropwise condensation. It has been discovered that added reservoir capacity may be obtained by etching out a part of the basis metal through the cracks in the chromium with a reagent that does not attack chromium. Etching through the cracks produces a series of channels under the cracks and does not require so thick a coating of poorly conducting chromium for high-pore volume. Alternatively, chromium may be electrodeposited containing pores instead of cracks. Individual reservoirs may then be etched out in the base metal under each pore. In either case, interconnected metal is provided for heat transfer.

The channels or individual reservoirs are impregnated with promoter or a solution of promoter. This is preferably done by applying a vacuum to the closed system of the surface immersed in the liquid and then releasing the vacuum. The promoting film on the surface is maintained during condensation by migration of promoter from the channels or reservoirs in the base metal through the capillary openings in the chromium deposit to the surface.

Another method of increasing the duration of dropwise condensation is to flame-spray a metal on the condenser surface. Flame-sprayed coatings are inherently porous and may be produced with sufficient interconnecting metal so that adequate heat conduction is obtained, especially if the sprayed metal has a relatively high thermal conductivity. The surface of the coating may be ground smooth, if necessary, and the pores then impregnated with promoter. The system provides the necessary reservoirs and pores for storage and migration of promoters, whereby a promoting film may be maintained on the surface for a long period of time. A relatively thick sprayed-metal film of good conductivity is required to obtain sufficient volume and good heat transfer when pores are not etched into the base metal.

Another method of increasing the duration of dropwise condensation is to provide a porous coating by electro-deposition. Such a porous electroplate can, for example, be provided by the method described in the article "The Electrodeposition of Porous Metal" found in Transactions Institute Metal Finishing 31, pp. 519–526 (1954). By this method, a coating of sufficient reservoirs, structural strength, and interconnecting metal is obtained to provide adequate heat conduction, allow the storage of sufficient promoter, and allow migration of promoter to the surface.

Other methods of obtaining porous surfaces suitable for increasing the duration of dropwise condensation, and the duration of increased heat transfer are contemplated by the invention which is not restricted to those specifically mentioned.

The following example is illustrative of the advantages of the present invention:

*Example*

Chromium was electrodeposited on 3/4-inch O.D. copper tubes from a bath containing 239.0 g./l. of $CrO_3$ and 1.8 g./l. of sulfuric acid. Electrodeposition was continued for 60 minutes at a current density of 425 amp./sq. ft. with the bath maintained at a temperature of $140 \pm 2$ F. Electrolytic etching of the deposit was carried out in a bath containing 240 g./l. of $CrO_3$. Etching was carried out for 2–3 minutes at a current density of 360 amp./sq. ft. with the bath held at $122 \pm 2$ F. Further etching of the copper base metal was carried out chemically by immersing the tube in a 50 percent solution of nitric acid for 10 minutes at a temperature of $80 \pm 5$ F. The rinsed and dried tube was vacuum impregnated with oleic acid. Three-foot tubes treated in this manner were mounted in a steam chamber and cooled internally with running water. With a water velocity of 6 ft./sec., the over-all heat-transfer coefficient by dropwise condensation on the promoted tube was determined to be 1500 B.t.u./ft.$^2$/° F./hr., as compared to a value of 700 B.t.u./ft.$^2$/° F./hr. for filmwise condensation on unpromoted and clean copper tube under the same conditions. After 140 hours of operation, dropwise condensation and a high rate of heat transfer were still being maintained by the promoted tube. Shorter sections of tubing mounted in a steam chamber at a steam pressure of 3 inches of water and cooled internally with a water velocity of 350 cc./min. continued to maintain dropwise condensation on their surfaces even after 500 hours. A monomolecular layer of oleic acid would not be expected to last under these conditions longer than 50 hours.

What is claimed is:

1. A heat-transfer device in which a condensable vapor is separated from a cooling fluid, comprising a wall for separating the cooling fluid from the condensable vapor, the condensing surface of said wall being provided with a film of dropwise condensation promoting material and formed with a plurality of reservoirs in said wall spaced from said condensing surface, capillary openings communicating said reservoirs with said condensing surface, said reservoirs being impregnated with dropwise condensation promoting material, and said capillary openings causing said dropwise condensation promoting material in said reservoirs to migrate from the reservoirs to the condensing surface by capillary attraction to replace lost portions of the film of dropwise condensation promoting material.

2. In a heat-transfer device wherein a condensable vapor contacts a cooling surface on a wall which is provided with a film of a dropwise condensation promoter, the improvement of providing in said wall a system of reservoirs spaced from said cooling surface, said reservoirs being provided with capillary openings communicating from said reservoirs to said cooling surface, said reservoirs being filled with dropwise condensation promoter, said capillary openings causing said promoter in said reservoirs to migrate from the reservoirs to the cooling surface by capillary attraction to replace lost portions of the film of dropwise condensation promoter.

3. A heat-transfer device in which two fluids are separated by means of a wall, said wall having at least one condensing surface provided with a film of dropwise condensation promoting material and formed with a plurality of reservoirs in said wall spaced from said condensing surface, capillary openings communicating said reservoirs with said condensing surface, said reservoirs being impregnated with dropwise condensation promoting material, and said capillary openings causing said dropwise condensation promoting material in said reservoirs to migrate from the reservoirs to the condensing surface by capillary attraction to replace lost portions of the film of dropwise condensation promoting material.

4. In a heat-transfer device wherein two fluids contact a wall provided on at least one condensing surface thereof with a thin film of dropwise condensation promoter, the improvement of providing in said wall a system of reservoirs spaced from said condensing surface, capillary openings communicating said reservoirs with said condensing surface, said reservoirs being impregnated with said dropwise condensation promoter which is continuous through said capillary openings with said film of dropwise condensation promoter, said capillary openings causing said dropwise condensation promoter in said reservoirs to migrate from the reservoirs to the condensing surface by capillary attraction to replace lost portions of the film of dropwise condensation promoter.

5. A heat-transfer device in which two fluids are separated by means of a metal wall, said wall having a metallic coating on at least one surface thereof, said metallic coating having capillary passages therethrough communicating from the outer surface of said metallic coating to reservoirs present in said metal wall, said outer surface of said metallic coating having a film of dropwise condensation promoter thereon, and said reservoirs being impregnated with dropwise condensation promoter in communication with said film through said capillary passages, said capillary passages causing said dropwise condensation promoter in said reservoirs to migrate to said outer surface by capillary attraction to replace lost portions of said film.

References Cited in the file of this patent

UNITED STATES PATENTS

| | | |
|---|---|---|
| 1,995,361 | Nagle | Mar. 26, 1935 |
| 2,248,909 | Russell | July 8, 1941 |
| 2,306,222 | Patnode | Dec. 12, 1942 |
| 2,469,729 | Hunter | May 10, 1949 |

OTHER REFERENCES

"Transactions Institute Metal Finishing," 1954, vol. 31, pages 517–526, published by Institute of Metal Finishing.